July 7, 1942.   G. ALLEMAN ET AL   2,288,769
OXIDATION OF HYDROCARBONS AND SEPARATION OF THE PRODUCTS THEREOF
Filed Sept. 5, 1936
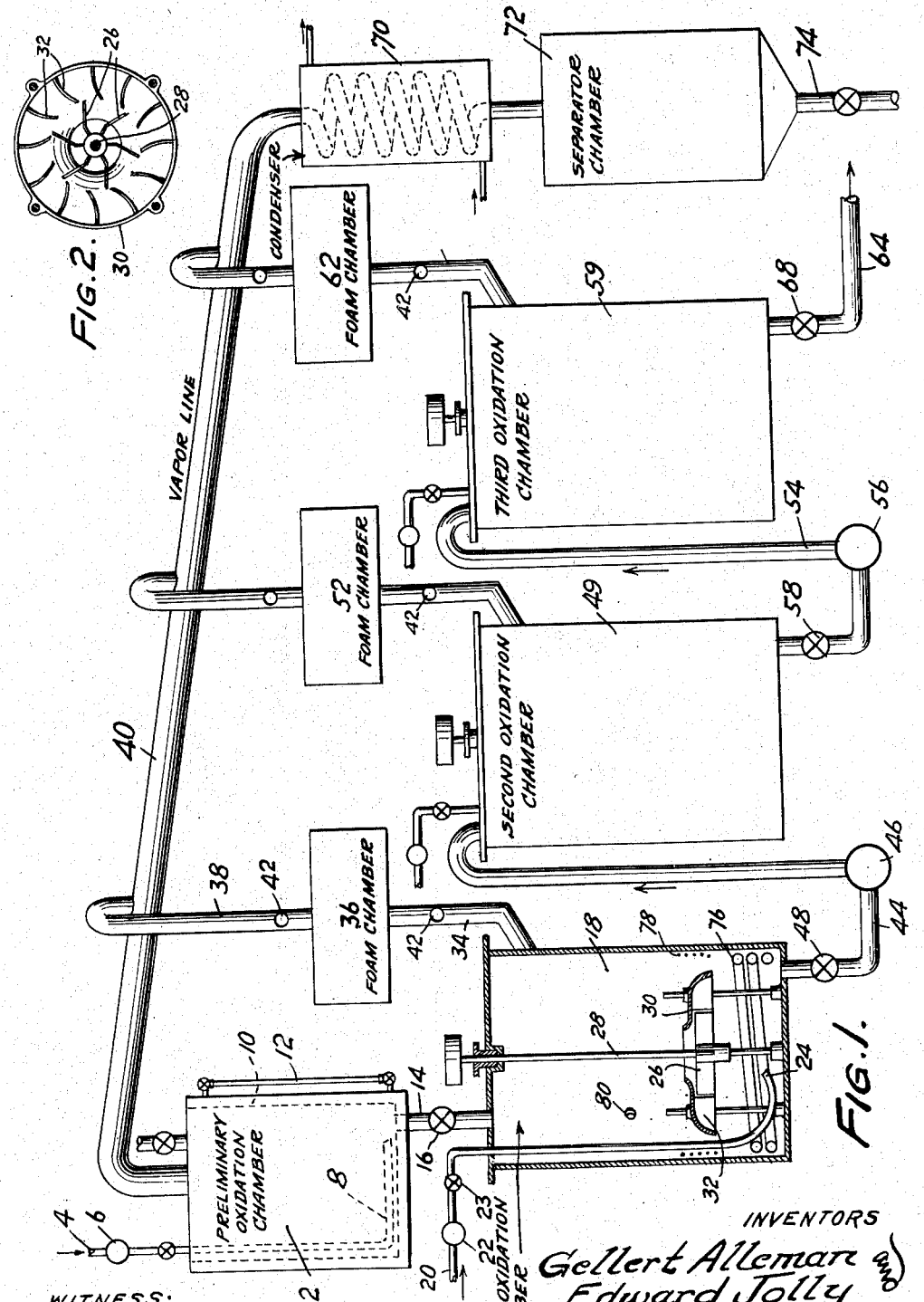
INVENTORS
Gellert Alleman
Edward Jolly
BY
ATTORNEYS.
WITNESS:

Patented July 7, 1942

2,288,769

UNITED STATES PATENT OFFICE 2,288,769

OXIDATION OF HYDROCARBONS AND SEPARATION OF THE PRODUCTS THEREOF

Gellert Alleman, Wallingford, and Samuel Edward Jolly, Prospect Park, Pa., assignors to Sun Oil Company, Philadelphia, Pa., a corporation of New Jersey Application September 5, 1936, Serial No. 99,643

5 Claims. (Cl. 260—451)

This invention relates to the oxidation of saturated and of unsaturated aliphatic hydrocarbons derived from petroleum, or from other sources, and also to the separation of the various classes of oxidation products from each other and from the unreacted hydrocarbons. This involves the separation of the acids formed from the unoxidized aliphatic hydrocarbons and their intermediate oxidation products.

The action of air, and other oxidizing agents, on aliphatic hydrocarbons, has been known for a long time. In nature, aliphatic petroleum hydrocarbons are slowly converted into those of an asphaltic type, under weathering conditions, and many investigators have attempted to imitate this process, on a commercial scale, by blowing petroleum or distillates of petroleum with air. However, no one previously has been able to separate these oxidation products into distinct classes of compounds and thus render them useful to a maximum degree. For instance, if the oxidized products contain acids, aldehydes, alcohols and unoxidized products, they will not be as valuable for various purposes as are the acids alone, the aldehydes alone, or the alcohols alone. Ketones may also be present as the result of decomposition reactions.

We have discovered that by oxidizing aliphatic hydrocarbons to alcohols, aldehydes, and acids, and separating each distinct class of the oxidized products, we are enabled to make efficient uses of these various classes of oxidized products; whereas the mixture of all of these oxidized products, including the unoxidized hydrocarbons, is not nearly so valuable as are the classes of separated oxidized products themselves.

It has long been known that when an aliphatic hydrocarbon is oxidized, the first step in the oxidation results in the formation of an alcohol; the next step, in the formation of an aldehyde; and the final step in the formation of an acid. This is well illustrated in the following typical example, using ethane to illustrate the reactions involved:

(a)     $CH_3 \cdot CH_3 + O \rightarrow CH_3 \cdot CH_2OH$
            Ethane        Ethyl alcohol (b)     $CH_3 \cdot CH_2OH + O \rightarrow H_2O + CH_3 \cdot CHO$
                                          Acetaldehyde (c)     $CH_3 \cdot CHO + O \rightarrow CH_3 \cdot COOH$
                          Acetic acid It will be noted that one methyl group ($CH_3$) alone is involved. It is possible to oxidize the other methyl group and obtain oxidized products such as ethylene glycol, and finally oxalic acid, in which latter both methyl groups in ethane have been oxidized to carboxyl groups (COOH). When more complicated aliphatic hydrocarbons are oxidized, the number of possible reactions involved is very great. For instance, there is only one possible ethane, but there are two isomeric butanes ($C_4H_{10}$); 9 isomeric heptanes ($C_7H_{16}$); 75 isomeric decanes ($C_{10}H_{22}$); 355 isomeric dodecanes ($C_{12}H_{26}$); 1,855 isomeric tetradecanes ($C_{14}H_{30}$); and 366,319 isomeric eicosanes ($C_{20}H_{42}$). It is therefore apparent that when the more complex aliphatic hydrocarbons, having high molecular weights, are oxidized, the possible number of individual oxidation products obtained is very great. However, it is well known that, unless decomposition reactions take place, these hydrocarbons, when oxidized, obey the well known formal reactions of first being converted into alcohols, then into aldehydes, and finally into acids. Side reactions may also take place. Alcohols may be converted into ketones, and hydroxy acids, in some cases, into lactones. The alcohols formed may react with the acids to form esters. There is evidence which indicates that combinations of various reaction products take place to form acids of greater complexity and correspondingly higher molecular weights than those first formed. Similar and also additional results are secured in the oxidation of unsaturated hydrocarbons.

Our oxidation process may be carried out as a batch process or as a continuous or semicontinuous process.

To illustrate the latter, there is provided the accompanying drawing, in which:

Fig. 1 shows diagrammatically an apparatus for carrying out a semicontinuous oxidation process; and Fig. 2 is a bottom plan view of a Turbo-mixer used for diffusing oxidizing gas through the hydrocarbon mixture.

We have observed that for the oxidation of each distinct aliphatic hydrocarbon, or a narrow cut of a distillate of aliphatic hydrocarbons, there is a definite temperature, which must be maintained within close range, if desirable oxidation products are to be obtained. As a rule, the higher molecular weight aliphatic hydrocarbons require a lower temperature for oxidation than the temperature required for the oxidation of aliphatic hydrocarbons of lower molecular weights. Great care must be exercised during the oxidation period in order to prevent decomposition reactions.

Oxidation takes place at temperatures as low as 120° C. but the rate is very slow. In the neighborhood of 150° C. the rate when wax is being oxidized is rapid. At higher temperatures, for example, 160° C. to 165° C., the oxidation takes place still more rapidly, but the products are darker in color. At temperatures of 170° C. oxidation is more rapid at first but toward the end of the run the rate of oxidation falls off, and in cases where the temperature used was 200° C., the saponification value of the product had decreased indicating that decomposition had taken place. In the case of oxidation of wax on a large scale, the procedure preferably followed is to start the oxidation at a temperature of 160° C. to 165° C. until the saponification value reaches about 40, then the temperature may be cut down to 150° C. to 155° C. for the remainder of the run, this being readily effected by controlling the flow of air after cutting off external heat.

The progress of the oxidation and the conditions which should exist are shown by the following tabulation showing the saponification numbers secured by starting in each case with 400 gms. of paraffin wax and using an air flow of 200 cc. per minute using ordinary diffusers:

| Time (hrs.) | 120° C. | 130° C. | 140° C. | 150° C. |
|---|---|---|---|---|
| 2 | 0 | 0 | 0 | 0 |
| 12 | 1.5 | 5.7 | 13.5 | 15.2 |
| 24 | 3.0 | 12.2 | 36.4 | 43.1 |
| 36 | 9.6 | 19.6 | 55.7 | 60.5 |
| 48 | 25.4 | 40.8 | 75.3 | 89.2 |
| 60 | 43.5 | 61.4 | 67.2 | 104.6 |
| 70 | 61.0 | 87.5 | 102.9 | 125.4 |
| Yield_____grams__ | 390 | 386 | 385 | 365 |

| Time (hrs.) | 150° C. | 155° C. | 165° C. | 170° C. |
|---|---|---|---|---|
| 5 | 3.2 | 3.8 | 4.4 | 5.2 |
| 17 | 18.6 | 20.1 | 22.0 | 22.5 |
| 29 | 46.8 | 48.2 | 51.6 | 54.1 |
| 40 | 62.9 | 63.5 | 69.1 | 73.2 |
| 52 | 93.1 | 94.8 | 102.7 | 105.0 |
| 66 | 114.0 | 116.3 | 128.9 | 125.0 |
| 78 | 130.3 | 132.0 | 142.3 | 130.0 |
| Yield_____grams__ | 365 | 366 | 352 | 344 |

The exit gases were passed through traps to separate any volatile matter formed. The volatile matter amounts to about 6 to 8 per cent of the weight of the starting material. About 2% of this is water insoluble, the remainder consisting of water containing low molecular weight acids. The saponification value of the insoluble material after thorough washing with water is about 175. Titrating the water with standard potassium hydroxide solution gives a saponification value of approximately 250. The amount of the volatile matter formed was not constant in each run. It apparently depended upon the temperature and duration of the run, more volatile matter being formed at high temperatures, as might be expected.

As an example of this oxidation, there may be cited the oxidation of paraffin wax having a melting point of 133° F. to 135° F. As a result of oxidizing this wax at 150° C. to 160° C. for a period of 140 to 180 hours, it is found that the oxidized products are straw yellow in color and approximately equal in weight to the weight of the wax originally used. The saponification number of the product may vary from 160 to 220, depending upon the conditions of time and temperature under which the oxidation is carried out. In this case it was found that about 0.3 part by weight of oxygen were used for each part of wax treated.

After selecting those aliphatic hydrocarbons which it is desired to oxidize, or a narrow cut of a distillate of such aliphatic hydrocarbons, the material is placed in a container made of aluminum or of an alloy material which is not attacked by the oxidation products formed. It is connected to appropriate narrow tubes and an expansion tank at the top, all being made of the same material. The use of such tubes results in good contact between the reactants, and a long period of reaction is obtained by passing the air through high narrow columns of the liquid. The hydrocarbons are heated to the desired temperature (150° to 160° C.) and air is passed in at the bottom and the reaction is continued until test samples indicate that a product is obtained which has the desired saponification, or acid number. If the temperature is carefully regulated, light colored oxidation products are obtained. For instance, in the oxidation of paraffin wax, an oxidation product is obtained which suggests, in color, a very light beeswax.

If the temperature is raised as much as 10° C. above the proper temperature, and all other conditions remain the same, the oxidation product obtained is chocolate colored. Inasmuch as the oxidation temperature which is most satisfactory is relatively limited for a given hydrocarbon, the optimum temperatures being in general lower for hydrocarbons of high molecular weight than for hydrocarbons of low molecular weight, it is desirable to use a comparatively narrow fraction of a hydrocarbon mixture as starting material for oxidation if a maximum yield of desirable products is to be obtained. For any given hydrocarbon it is easy to determine by preliminary experiment the optimum temperatures to use in the oxidation of large quantities. The temperatures will in general fall approximately in the ranges indicated. In case a comparatively small amount of a naphthenic base oil is added to a paraffin oil, the mixture is comparatively difficult to oxidize under the conditions which prevailed for the optimum oxidation of the paraffin oil alone. In general, it will be found that a somewhat higher temperature is necessary It has been observed that practically no acid is formed for a certain period of time after air is applied to the hydrocarbon mixture, and it is assumed that during this period a non-acidic material, similar to alcohol, is produced. After this latent period, aldehydes or ketones are formed and then the aldehydes or ketones are converted into acids. Upon the application of air, after the hydrocarbons have been heated to the desired temperature, exothermic reactions take place, and the application of external heat is not required. The temperature can readily be regulated by increasing or decreasing the flow of air. Since side reactions take place, involving the formation of decomposition products, it is desirable to decrease the temperature slightly during the latter part of the oxidation period.

The latent or induction period just described is dependent on several factors. First is the temperature, the period being shorter as the temperature is raised. In general, at this stage there is no great objection to raising the temperature, inasmuch as the color of the final product depends rather more upon the temperatures used during the subsequent stages of the oxidation. Catalysts of various types tend to decrease the induction period but are not generally desirable if carried over into the later stages of the oxidation since they tend to give rise to dark-colored, or, in some instances, substantially different products. Another factor which determines the length of the induction period is the degree of refining to which the oil used has been subjected. Oils which have been highly refined have a shorter induction period than unrefined or only slightly refined oils. The refining may be accomplished by treatment with sulphuric acid or by extraction of naphthenic or asphaltic substances with solvents such as sulphur dioxide, nitrobenzene, $\beta$, $\beta$ dichlorethyl ether, benzaldehyde, amyl, butyl or propyl alcohols, furfural, aniline, pyridine, dichlorethylene, methylisobutylketone, phenols, etc.

Instead of refining in the above fashion, resort may be had to hydrogenation by any of the conventional processes.

The material of the reaction vessel is also of some importance. Various stainless steels, Monel metal and aluminum have been found to be very satisfactory, as they are but slightly attacked by the products of the oxidation reaction and colorless final products are obtained.

It has been found that by employing a Turbo-mixer (described more fully below), comprising a stirrer and flow ring in a suitable mounting to cause air to be circulated from the surface of the liquid, or to disperse air admitted under pressure below the stirrer, the time required for the oxidation is materially decreased. It therefore appears that the application of greater volumes of air, well dispersed, produces, in a shorter time, larger amounts of oxidized products.

The advantages of the use of a Turbo-mixer will be clear from a consideration of the following tabulation involving the oxidation of paraffin wax. The oxidation products recovered were 87% of the wax used. The mixer was operated at about eight hundred R. P. M.

| Time (hrs.) | Temperature °C | Saponification number |
|---|---|---|
| 0 | 140 | 0 |
| 1 | 165 | 1.5 |
| 2 | 171 | 4.8 |
| 4 | 167 | 15.5 |
| 6 | 167 | 24.8 |
| 8 | 167 | 37.6 |
| 10 | 170 | 51.2 |
| 12 | 167.5 | 62.7 |
| 14 | 170 | 76.0 |
| 16 | 172 | 82.0 |
| 18 | 173 | 89.5 |
| 20 | 169 | 101.5 |
| 22 | 165 | 110.0 |
| 24 | 165 | 121.5 |
| 26 | 166 | 135.5 |
| 28 | 160 | 142.5 |

We have found that by the application of pressure during the oxidation process, the time required to complete a satisfactory run is considerably reduced. We have also determined that catalysts, especially those containing either vanadium pentoxide, or copper chromite, accelerate the oxidation and shorten the time, but that they also aid decomposition reactions towards the end of the oxidation period. Manganese dioxide prevents the oxidation reaction products from reaching a saponification number above about 60 and the oxidation products were very gummy and difficultly soluble in hydrocarbon oils. This indicates that manganese dioxide induces polymerization or resinification. These gummy resinous products are of value in the preparation of certain desirable types of varnishes.

The oxidation of aliphatic hydrocarbons can be conducted as a continuous process, the apparatus being built of aluminum or of an alloy material which is not attacked by the products of oxidation, and arranged to operate with or without pressure, and with or without catalysts. The apparatus used for a continuous process is preferably provided with accurate thermo regulators at appropriate locations in order to control the increasing temperature produced by the exothermic reactions which are taking place. Preferably a stepwise arrangement is used providing a series of zones in which successive steps of the oxidizing process occur under the control of thermo regulators.

Fig. 1 of the drawing shows a type of apparatus which may be used for carrying out a semi-continuous oxidation process. In this figure there is indicated at 2 a storage tank in which there may be conducted the preliminary treatment of the oil through the induction period mentioned above. Air is introduced into this tank through a valve-controlled passage indicated at 4, including a meter 6 indicating the volume of air introduced. The passage communicates with a distributing arrangement 8 in the form, for example, of a perforated coil located at the bottom of the tank. The tank is jacketed as indicated at 10 so that it may be heated by steam or in some other fashion to bring the material up to the necessary temperature for the induction period. A sight glass 12 is provided to indicate the amount of oil in the storage tank. The upper end of the tank communicates with a vapor header 40 which will be referred to hereafter.

Communication from the storage tank to a tank 18 is afforded through a passage 14 controlled by a valve 16. The tank 18 is arranged to hold the oil during the preliminary oxidation stages following the induction period. During the oxidation stages following the induction, it is desirable to secure the optimum dispersion of the air or other oxidizing gas. Such gas is led into the tank through a connection 20 including a meter 22 and a controlling valve 23 for the purpose of giving a known regulation of the amount of air. The air enters the tank through the upturned end of the connection 20 indicated at 24 below a Turbo-mixer comprising a rotor 26 mounted on a shaft 28 and associated with a stator member 30 containing diffuser blades indicated at 32. The construction of this mixer is indicated in inverted plan in Fig. 2. A mixer of such type produces an extreme amount of turbulence when driven at speeds of about 800 R. P. M. and produces the fine dispersion of the oxidizing gas which is necessary for the most effective and rapid oxidation.

At the upper end of the reaction vessel 18 there is located an outlet pipe 34 communicating with an expansion tank indicated at 36 which preferably has a volume approximately one-fourth that of the reaction vessel. Joining the top of the expansion tank to the header 40 is a tube 38. The expansion tank is provided since during the oxidation process a large amount of foam is produced which flows into the expansion tank and, coming to rest therein, breaks up, with the result that the gases and vapors contained therein will pass into the header 40 while the oil and oxidation products may flow back into the reaction vessel. Sight glasses 42 are provided above and below the expansion tank in order that the operation may be watched and passage of any foam into the header 40 avoided.

The oxidation occurring in the reaction vessel is exothermic in character and provision should be made to avoid the rise of temperature above the optimum values. In the initial stages of the reaction it may also be desirable to add some heat to maintain the temperature to a proper degree until the reaction takes place with an activity necessary to maintain the temperature. Consequently the reaction vessel is provided with a cooling coil 76 through which cold water may be circulated for cooling purposes and also desirably with electrical heating means such as indicated at 78, designed to maintain the temperature initially as indicated above. It may be pointed out that inasmuch as the oil is received from the storage tank where it had a temperature higher than that required for the reaction in vessel 18, it is sufficient to provide for a relatively slight amount of heating and consequently electricity may be quite economically used instead of using a steam jacketed or otherwise heated reaction vessel. The vessel is preferably insulated.

The reaction vessel 18 contains a thermometer preferably in the nature of a thermostat, indicated at 80. This serves not only to indicate the existing temperature, but also to automatically regulate the flow of current through 78 or the flow of cold water through 76 to maintain the temperature at the desired point. Additionally, or instead of controlling the temperature by means of cold water, the thermostat may control the flow of air by automatic operation of the valve conventionally illustrated at 23. Since a minimum time of reaction is desired, it is preferable to keep the air flow at its optimum value and control the temperature by means of cooling water.

From the reaction vessel 18 the oil may be pumped through a conduit 44 controlled by a valve 48 by means of a pump 46 into a second reaction vessel 49, which contains a Turbo-mixer and other elements the same as the reaction vessel 18 and is similarly connected through a passage 50 with an expansion tank 52 which in turn communicates with the header 40. The temperature in this second reaction vessel is controlled as in the case of the first but may have a different value depending upon the particular material being treated. It is for this reason that separate reaction vessels are used. Close automatic regulation is highly desirable, though, since rapid changes do not take place, an attendant may effect manual control when that is indicated by the temperatures or by the nature of test samples.

From the reaction vessel 49 the hydrocarbons may pass to a third vessel 59 through a passage 54 controlled by a valve 58 and containing a pump 56. Instead of providing pumps, it will, of course, be obvious that gravity flow may be used. If the oxidation is to take place under pressure, then suitable provisions may be made for maintaining the same or different pressures in the various vessels. Pumps, in such case, will be essential to control the flow. The last reaction vessel shown, which may be followed by others if desired, is in communication, through 60, with its expansion tank 62, which in turn communicates with the header 40. Discharge from the last tank is controlled by a valve 68 and takes place through a conduit 64.

The header 40 which receives the waste gas and the volatile products from the various reaction chambers, including the storage tank, discharges into a condenser 70, the condensate from which is delivered to a separator 72, in which the products will separate into aqueous and non-aqueous layers. The contents may be withdrawn from time to time through a valve-controlled outlet 74.

By having a series of reaction vessels and a storage tank as indicated above, it will be obvious that by means of the individual automatic controls in the various reaction vessels and the individual control of air flow thereto, the oxidation may be very closely regulated to secure the desired results. The processing of any given batch of oil may, of course, be broken up into more or less steps depending on the accuracy of control which is desired. It will be found readily possible to adjust the procedure so that the passage of the oil from the storage tank to the first reaction vessel and from one reaction vessel to the next may take place at approximately the same time, so that a substantially continuous process results. It will be clear, of course, that instead of maintaining constant conditions in a given reaction vessel throughout the entire time it contains a certain batch, the conditions of temperature, air flow, pressure or the like may be changed from time to time.

The valves and pumps controlling flow of the air through the apparatus may be operated by a time-controlled motor to pass through successive cycles of operation or, alternatively, they may be operated manually, the latter being quite feasible since the times involved in the various oxidation steps may be quite long.

As a specific example of the operation of an apparatus of this nature, the initial temperature to which the oil may be raised in the storage tank may be about 200° C. The first reaction vessel 18 may be operated at about 190° C., the second vessel 49 at about 175° C. and the third vessel 59 at about 150° C. The oil may remain in the various vessels for any desired periods of time to secure total oxidation periods such as indicated above.

The average molecular weights of the more volatile fractions derived from the oxidation of one sample paraffin wax varied from 106 for a cut boiling between 170-180° C. to 182 for a cut boiling between 260° C. and 271° C. The saponification number of the first cut was 423; the saponification number of the last cut was 267. The average molecular weight of the paraffin used was 315.6; the average molecular weight of the material, as removed from the oxidizers, was about 520.

The oxidized products, as removed from the oxidizer, generally contain a small amount of water soluble materials. When these water soluble materials are removed, by washing with hot water, the average molecular weight of the product is increased and the saponification number is decreased. An oxidized product obtained from paraffin, before washing with water, had an average molecular weight of 520 and a saponification number of 165.1. After washing this same product with hot water, its average molecular weight increased to 550 and its saponification number decreased to 160. This proves that some of the acids formed are soluble in water. The acetyl values of the residue obtained after saponification of all of the acids and separating the soap, indicate that alcohols are present in the residue. They are also present in the condensed oily volatile material which passes over with the water.

The iodine values of most of the volatile oxidation products of saturated hydrocarbons indicate that they are essentially saturated compounds; the iodine numbers most of the less volatile products indicates that they also are saturated oxidation products. When unsaturated aliphatic hydrocarbons are oxidized, unsaturated oxidation products are obtained.

What is described above differs from what was done by previous investigators primarily in details, the use of a semicontinuous controlled process, etc. The products which other investigators probably obtained, and which we obtained up to this point, are only of very indifferent value in consequence of the fact that the various classes of compounds such as acids, aldehydes, ketones, alcohols and unoxidized hydrocarbons are present, mixed together, and while one class of compounds may be of use, the other classes present diminish such utility. In other words, certain classes of oxidation products in the entire oxidation mixture are incompatible with other classes of oxidation products present in such mixture and the value of one class of products is counteracted or diminished by the presence of other classes of oxidation products. It is therefore highly desirable, in fact, substantially necessary for our purposes, to separate the various classes of oxidized products obtained from each other and also from the unoxidized aliphatic hydrocarbons in order to obtain the highest efficiency in their employment. As illustrating the necessity of removing one class of oxidized products from the other, and also from the unoxidized products, we may mention that if the mixed oxidation products obtained by oxidizing paraffin wax, and which contain unoxidized hydrocarbons, are employed in the manufacture of calcium greases, such greases will not pass the physical and chemical tests demanded of commercial greases of the highest grade. If, however, these oxidized materials are separated from the unoxidized materials, and grease is made from certain of the separated materials, such greases pass every required test.

Preliminary separations may be effected in several ways. For example, since the greater part of the oxidation products have lower melting points than the original paraffin, a certain amount of separation may be effected by keeping the oxidized material at a temperature a few degrees below the melting point of the paraffin for some time and then removing the liquid products. A perfect separation cannot be obtained in this way as the paraffin is soluble in the liquid oxidation products. The partial separation may be effected by pressing the oxidized products through a filter press, the unoxidized wax being retained by the filter cloth.

The oxidized products also contain a small amount of water soluble material. Removal of this material by thorough washing with hot water increases the average molecular weight and decreases the saponification number. After washing with water the remaining products have a pleasant fruity odor. Saponification of oxidation products which have been washed with water as above, followed by acidification of the soap solution to liberate the free acids and the washing of the free acids with water to remove soluble acids, mineral acids and any additional water-soluble acids which might have been formed during the process, decreases the saponification number and increases the average molecular weight to a substantial extent. The increase in molecular weight and decrease in the saponification number of the water-washed material may be explained by the presence of low molecular weight water-soluble acids of high saponification number.

In order to separate the acids from other oxidation products and from unoxidized hydrocarbons, we proceed as follows:

After determining, by means of the saponification number, the amount of caustic soda required to saponify the acidic materials present, a given weight of the oxidized mixture is placed in a pressure cooker, a slight excess of the amount of caustic soda solution necessary for neutralization is added, and an amount of water equal to between 40 and 50% of the volume of the oxidized products added. The pressure cooker is then closed, and heat applied until the temperature reaches about 150° C. and the pressure about 60 to 75 pounds per square inch. After the aqueous solution of the soap formed separates from the intermediate oxidation products and from the unoxidized hydrocarbons, the latter floating on the aqueous solution, the heating is discontinued and the mixture allowed to cool. During the cooling period, air pressure is applied in order to prevent boiling and consequent re-emulsification. Instead of using air pressure at this time a hydrocarbon having a boiling point lower than that of water may be preliminarily added to the mixture, so that it will maintain during the cooling a pressure sufficient to prevent boiling of the aqueous layer. Incident to this treatment, the soap formed enters the water layer, at the bottom, and the unreacted hydrocarbons, the alcohols and other intermediate oxidation products are found on top of the aqueous solution of the soap. After the entire mass has cooled to such a temperature that re-emulsification will not take place, the pressure is relieved and the aqueous solution, containing the soap, withdrawn at the bottom. This soap solution is acidified with mineral acids such as hydrochloric or sulphuric acid, and the free organic acids liberated. These acids can be used as recovered, or they can be distilled under a high vacuum, after being rendered free from water, in which event honey colored products of varying acid numbers are obtained. These acid numbers vary between about 435 for the more volatile acids having relatively low molecular weights, to about 90 for those high boiling acids whose molecular weights are high. The color of these acids can be markedly improved by passing them through filters packed with porous clay, infusorial earth, silica gel, or other similar filtering materials.

A similar process applied to the separation of soaps obtained in the refining of mineral oils is described in Alleman Patent 1,694,463, dated December 11, 1928, and in Angstadt Patent 1,931,880, dated October 24, 1933.

The unoxidized material, together with the intermediate oxidation products which do not form soaps, are found in the water insoluble residue floating on top of the aqueous solution of the soap. The alcohols may be separated, in part, from this residue, by treatment with concentrated sulphuric acid. They form sulphated or sulphonated alcohols. They can also be partially, but not completely, recovered unchanged as alcohols, by distillation under a high vacuum. By the latter process, however, some unreacted hydrocarbons pass over with them. They can also be extracted by suitable solvents, or separated by their difference in melting point; or by a combination of solvent and centrifugal processes. The unreacted hydrocarbons can be returned to the oxidation outfit and further oxidized.

The oxidation products of these aliphatic hydrocarbons are completely soluble in ether, benzene, carbon tetrachloride, toluene, xylene, gasoline, and mineral oils. The fact that they are completely soluble in low boiling hydrocarbons indicates that hydroxy acids are not present, at least to any appreciable extent.

An important method for separating the low boiling acids from those having higher boiling points consists in the fractional saponification of the mixture. If several products may be formed during the saponification process, that compound will first be formed which evolves the greatest amount of heat. It has been determined that those acids which have the lowest boiling points and the lowest molecular weights react first with caustic alkalies to the exclusion of the formation of soaps of higher molecular weights. First we separate these more volatile acids from the other acids and other intermediate oxidation products and unreacted hydrocarbons by adding an amount of caustic soda, or of caustic potash, or of other alkalies, which is insufficient to saponify the entire amount of acids present. Water is then added to the extent of about 40 to 50% of the acids and the mixture heated to about 150° C. in a closed pressure vessel. The pressure developed is usually about 60 or 75 pounds per square inch. After the separation has taken place, air pressure is applied, during the cooling process, in order to prevent boiling and re-emulsification. When cooled, the aqueous soap solution of the low molecular weight acids is withdrawn at the bottom and used as such, or the acids recovered by acidifying the solution with sulphuric or hydrochloric acids. By a similar procedure the remaining acids of higher molecular weights may be separated and recovered from the unoxidized hydrocarbons and the intermediate oxidation products. These processes may be repeated as often as desired.

A portion of these acids react with concentrated sulphuric acid either in the cold or on moderate heating to form sulphated or sulphonated products which are soluble, or are colloidally dispersed in water and act as emulsifying agents. These sulphated or sulphonated products can be separated from the unreacted acids by adding water to the entire treat, placing the resulting emulsion in a pressure boiler, applying heat until a temperature of about 150° C. is reached, accompanied by a pressure of about 60 to 75 pounds per square inch. Under these conditions the sulphated or sulphonated acids dissolve in the water, and the unreacted acids float on top. Air pressure is applied during the cooling process in order to prevent boiling and consequent re-emulsification. The sulphated or sulphonated acids may be recovered from the water solution by the ordinary process of "salting out". A similar process can be applied for the recovery of the sulphated or sulphonated alcohols obtained by the oxidation of aliphatic hydrocarbons.

As examples of separations carried out along the above lines, there may be cited the following:

10 kilograms of the oxidation products of refined paraffin wax having a saponification number of 159 and an average molecular weight of 510 were treated with 1060 grams of caustic soda in the pressure separator as previously described. Acidification, by the addition of dilute mineral acid, of the soap solution obtained gave 5.8 kilograms of organic acids which had a saponification value of 150.1 and an average molecular weight of 489. The unsaponified material (unsaponifiable by aqueous caustic soda), amounted to 3.5 kilograms and had a saponification value of 23 and an average molecular weight of 393.

10.2 kilograms of an oxidation product of slack wax having a saponification value of 106.5 and an average molecular weight of 505.5 was treated with 1,000 grams of caustic soda in the pressure separator. Acidification gave 5.7 kilograms of organic acids which had a saponification number of 119.1 and an average molecular weight of 493. The unsaponified material amounted to 4.1 kilograms and had a saponification number of 20.2 and an average molecular weight of 425.

10 kilograms of an oxidation product of refined paraffin wax having a saponification number of 159 and an average molecular weight of 510 was treated in the pressure separator with 280 grams of caustic soda, an amount sufficient to saponify 25% of the acids present in the oxidation product. Treatment with mineral acid of the soap solution obtained gave 130 grams of organic acids having a saponification number of 278 and an average molecular weight of 268. The insoluble material containing unoxidized paraffin, intermediate oxidation products and unsaponified acids had a saponification number of 125.5. Treatment of this residue with sufficient caustic soda to completely saponify the remainder of the acids and separation of the mixture under pressure resulted in a separation of 3.5 kilograms of unsaponifiable material. Acidification of the soap solution gave 5.8 kilograms of acids which had a saponification value of 152.1 and an average molecular weight of 504.

10 kilograms of an oxidation product of paraffin wax having a saponification number of 159 and an average molecular weight of 510 was treated in the pressure separator with 377 grams of caustic soda, an amount sufficient to saponify one-third of the acids present in the oxidation product. Acidification of the soap solution gave 1.125 kilograms of acids having a saponification number of 187 and an average molecular weight of 401. Saponification of the residue amounting to 8.63 kilograms, and having a saponification number of 99.5, and separation of the soap solution and acidification, gave 5.1 kilograms of acids having a saponification number of 124 and an average molecular weight of 513. The unsaponifiable material amounted to 3.38 kilograms and had a saponification number of 22.3 and an average molecular weight of 403.

A portion of the acids formed by the oxidation of aliphatic hydrocarbons reacts with sulphuric acid or other sulphonating agents such as chlorsulphonic acid to form compounds of the type of Turkey-red oil. These reaction products may be separated from the unreacted acids in the following manner:

10 kilograms of the acids obtained by the oxidation of paraffin wax, freed from unoxidized hydrocarbons and intermediate oxidation compounds, may be treated with 5 to 20% of their weight of sulphuric acid, preferably the foaming acid containing 15% $SO_3$. The sulphuric acid is added to the organic acids slowly and with vigorous stirring. The temperature should be kept below 30° C. during this addition. If desired, carbon tetrachloride or other inert solvent may be added to reduce the viscosity of the mixture and to promote more efficient agitation. After the sulphuric acid is added, the reaction product is dispersed in water in order to remove excess sulphuric acid. The resulting emulsion may be broken up by adding salt or other electrolyte, this process being repeated several times in order to insure a substantially complete removal of the sulphuric acid. The reaction product is then placed in the pressure separator previously described and an equal volume of water added and the mixture heated under pressure. The water solution or dispersion of the reaction products is then withdrawn from the bottom of the tank while the unreacted acids are found on top of the water solution and are separated. The purified sulphated product is obtained from the water solution or dispersion by adding salt or other electrolyte. From 10 kilograms of acids 1 to 2 kilograms of sulphated products are obtainable.

The unsaponifiable material which is separated from the acid material in the pressure saponification process contains intermediate oxidation products such as alcohols which react with sulphuric acid to form products of considerable value as wetting or dispersing agents. These alcohols may be partially purified by extraction by solvents or by distillation; but these products are always contaminated by impurities. The sulphuric acid reaction products of the alcohols may be obtained in a relatively pure state by the following procedure:

10 kilograms of unsaponifiable material are treated with 10 to 30% of foaming sulphuric acid containing 15% $SO_3$. The procedure for separating reaction products is the same as outlined in the previous example. Approximately 3 kilograms of sulphated material may be thus obtained from 10 kilograms of the unsaponifiable products.

While the oxidized products obtained by us by treating aliphatic hydrocarbons with air, or other oxidizing agents, with or without pressure, and with or without catalysts, have probably been obtained before, no one heretofore has separated these various oxidation products into classes and substantially freed them from unoxidized aliphatic hydrocarbons, and therefore no one ever before has obtained oxidized products from aliphatic hydrocarbons having the properties which render them useful to such a degree or extent as are the products which we have oxidized and separated.

The separated acids can be saponified, with caustic soda or with caustic potash, the soap dehydrated and added to lubricating oil, in which it is completely soluble. This forms a "cutting oil" which is emulsifiable with water. This product can also be used as a dispersing agent for various insecticides, and can be used as recovered, when properly diluted, as an agricultural spray. Certain residues derived from the oxidation of paraffin, when reacted with lime to form calcium soaps, and the latter added to lubricating oils, form greases which possess all the physical and chemical properties demanded of the highest grade of greases. The entire crude separated acids obtained by the oxidation of slack wax, yield calcium greases which are equal, in every respect, to the calcium greases made from the residue of the oxidation of refined wax, which latter residue boils above 255° C. at 4 mm.

Lime greases can be made from almost any acid or glyceride of animal or of vegetable origin, but many such greases will not meet the standard requirements demanded of greases of the best grade. The best lime greases must not break down when subjected to mechanical agitation; they must not emulsify when mixed with water; they must have a high melting point; and their stability must not depend on the presence of moisture, that is, they should be true solutions of the metallic soaps in oil and not merely suspensions stabilized by the presence of moisture. Our lime greases made from various oxidation products obtained by reacting aliphatic hydrocarbons with air are superior to the greases made from fats and fatty acids of animal and of vegetable origin in that they are true solutions of metallic soaps in oil and do not require moisture to render them stable and give them body. They also are far superior to other greases in consequence of the fact that their melting point is higher. They are not affected by mechanical agitation.

The soaps made from the separated acids, whether such acids are distilled or not, do not possess good frothing or foaming properties. This property renders them unfit for the manufacture of ordinary industrial and toilet soaps when used alone. If, however, they are added to other soap-making materials to the extent of about 25%, the resulting soaps are of considerable value for all purposes. It is well known that most commercial soaps are made out of oils and fats from various sources, and that such soaps usually are made of from 20 to 30 different saponifiable oils or fats.

The more volatile products obtained by the oxidation of aliphatic hydrocarbons have pleasant odors and consequently may be employed in the perfume industry. These lower distillates contain alcohols and the lower members of the fatty acid series. They can also be utilized in the manufacture of esters intended for lacquer solvents.

The alcohols obtained by the oxidation of aliphatic hydrocarbons, have important industrial applications. When sulphated or sulphonated and the sodium salts made of such products, the resulting compounds do not react with hard or acid waters and therefore they may be used in the textile and dyeing industries.

One of the most important uses of these alcohols concerns the reaction products obtained by treating them with phosphorous oxychloride. Under these conditions, ester phosphates are probably formed, and the addition of as little as 2% of these products to a lubricating oil renders the latter an extreme pressure lubricant. To illustrate: A lubricating oil when tested on the Almen machine seizes at about 3000 pounds pressure. When 2% of these phosphorous compounds is added to the same lubricating oil, the resulting product is converted into an extreme pressure lubricant and the product passes through the Almen machine when a pressure of 15,000 pounds is applied. These alcohols react with phosphorous thio chloride to form products which, when added to lubricating oils, in small amounts, form valuable extreme pressure lubricants.

It has been found that certain distillates obtained from the separated acids form a very efficient substitute for stearic acid in connection with various processes in the rubber industry.

These products are also of interest as a substitute for the Twitchell or Petroff reagents in the hydrolytic splitting of fats.

The gel forming ability of the sodium and potassium soaps of the acids derived by the oxidation of aliphatic hydrocarbons renders them of distinct value as wire drawing lubricants.

Some of the acids formed by the oxidation of aliphatic hydrocarbons react with sulphuric acid to form products which possess the characteristics of sulphated or sulphonated alcohols, or of products similar to Turkey-red oil.

The soaps made from these acids are soluble in or react with phenols and this solution or reaction product is soluble in hydrocarbon oils. When added to water, this product forms an emulsion or dispersion which is valuable as a sheep dip or for other purposes where antiseptic solutions are required. The amount of the phenol added to the acids may vary between 10 and 30%. Twenty-five per cent. of this product added to 75% of hydrocarbon oil forms an efficient spray oil, or emulsifying oil.

The processes of separation described herein are claimed in divisional applications Serial Nos. 165,480 and 165,481, filed September 24, 1937.

What we claim and desire to protect by Letters Patent is:

1. The method of oxidizing aliphatic hydrocarbons comprising passing oxygen-containing gas into said hydrocarbons while the hydrocarbons are heated within the range of about 120° C. to 200° C., and substantially lowering during the latter part of the oxidation the temperature of the hydrocarbon which is being treated after partial oxidation has taken place.

2. The method of oxidizing aliphatic hydrocarbons comprising passing oxygen-containing gas into said hydrocarbons while the hydrocarbons are heated within the range of about 120° C. to 200° C., and substantially lowering during the latter part of the oxidation the temperature of the hydrocarbon which is being treated after partial oxidation has taken place, said lowering of temperature being effected by control of the flow of oxygen-containing gas.

3. The method of oxidizing aliphatic hydrocarbons comprising passing oxygen-containing gas into said hydrocarbons while the hydrocarbons are heated substantially within the range 150° C. to 165° C. and following partial oxidation continuing the treatment with oxygen-containing gas at a substantially lower temperature than that originally used.

4. The method of oxidizing aliphatic hydrocarbons comprising passing oxygen-containing gas into said hydrocarbons while the hydrocarbons are heated substantially within the range 160° C. to 165° C. and following partial oxidation continuing the treatment with oxygen-containing gas at a temperature substantially within the range 150° C. to 155° C.

5. The method of oxidizing aliphatic hydrocarbons comprising providing a series of zones having substantially different temperatures and maintaining batches of hydrocarbons in succession in said various zones while introducing into them oxygen-containing gas, the temperatures of said zones being in decreasing order from the first to the last.

GELLERT ALLEMAN.
SAMUEL EDWARD JOLLY.